3,415,834
DERIVATIVES OF 2-ANILINO-NICOTINIC ACID
AND PROCESS FOR THEIR PREPARATION
Charles Hoffmann, Enghien-les-Bains, and Andrée Faure, Paris, France, assignors to Societe anonyme dite: Laboratoires U.P.S.A., Gennevilliers, France, a French company
No Drawing. Filed Dec. 15, 1964, Ser. No. 418,539
Claims priority, application Great Britain, Dec. 19, 1963, 50,274/63; Mar. 25, 1964, 12,723/64
11 Claims. (Cl. 260—295.5)

ABSTRACT OF THE DISCLOSURE

Analgesic and anti-inflammatory compounds are described which are substituted amino- and anilino-nicotinic acids and salts. Typical compounds are xylylamino-nicotinic acid, p-lower alkoxyanilino-nicotinic acids, and o-hydroxyanilino- and o-methyl-p-chloro-anilino-nicotinic acids which are cyclized when the phenyl nucleus contains an o-carboxy group.

---

This invention relates to nicotinic acid derivatives, their preparation, and pharmaceutical compositions containing them.

The compounds of the invention are those of the formula:

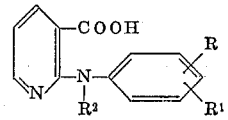

I in which R represents a hydroxy, alkyl, e.g. methyl, haloalkyl, e.g. trifluoromethyl, alkoxy, e.g. methoxy or ethoxy, carboxy, carboalkoxy, e.g. carbomethoxy, or halogen, e.g. chlorine, radical, $R^1$ is a hydrogen, hydroxy, alkyl, haloalkyl, alkoxy, carboxy, carboalkoxy, or halogen radical, and $R^2$ is a hydrogen atom or an acyl, e.g. alkanoyl, group, and the phenyl nucleus may be substituted by one or more additional alkyl radicals, and their water-soluble salts. The said alkyl, haloalkyl, alkoxy, carbalkoxy, acyl and alkanoyl radicals preferably contain a maximum of 4 carbon atoms. The most valuable compounds are those of the aforesaid formula in which R represent hydroxy, alkyl of up to 4 carbon atoms, trifluoromethyl, alkoxy of up to 4 carbon atoms, carboxy, carboalkoxy of up to 4 carbon atoms, or chlorine radical, $R^1$ is hydrogen, hydroxy, or alkyl of up to 4 carbon atoms, and $R^2$ is a hydrogen atom or an alkanoyl group of up to 4 carbon atoms, and its water-soluble salts with non-toxic, e.g. sodium, cations.

Another valuable class of compounds are those of the aforesaid formula in which $R^1$ and $R^2$ are both hydrogen and R represents a hydroxy, alkyl, alkoxy, carboxy, carbalkoxy, or halogen radical, and the phenyl nucleus may in addition be substituted by one or more alkyl radicals, and their water-soluble salts. Preferred compounds of this class are those in which R represents hydroxy, alkyl of up to 4 carbon atoms, alkoxy of up to 4 carbon atoms, carboxy, or chlorine, and, when R is alkyl or chlorine, the phenyl nucleus may in addition be substituted by an alkyl radical of up to 4 carbon atoms, and their water-soluble salts having non-toxic cations.

These new compounds have analgesic and anti-inflammatory effects and may be used in the treatment of, for example, gout, rheumatic pelvi-spondylitis, polyarthritis, and phlebitis.

It has been found that when, in the aforesaid compounds, the phenyl nucleus contains an ortho-carboxy group, internal cyclization of the compound may take place to produce a nucleus of formula:

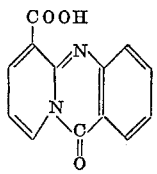

Such compounds form, with two molecular equivalents of a base, salts having the normal structure represented by the general formula given above. The general formula used herein is to be understood as including such cyclized compounds within its scope.

According to a feature of the invention, the new compounsd are produced by condensing a 2-halo-nicotinic acid with an aniline derivative of formula:

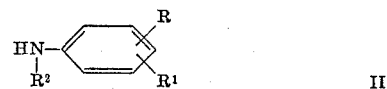

II where R, $R^1$ and $R^2$ are as previously defined, preferably in the presence of copper powder or potassium iodide as catalyst, and in the presence or absence of a solvent, followed, where desired, by conversion of an acid then obtained into a water-soluble salt thereof.

According to a further feature of the invention, the compounds of Formula I in which $R^2$ is an acyl group are prepared by acylating a compound of Formula I in which $R^2$ is a hydrogen atom. The acylation may, for example, be carried out using an alkanoyl halide or anhydride in the presence of an acid-binding agent.

It is within the scope of the invention to convert one compound of Formula I into another compound of that formula, e.g. a compound in which R is carboalkoxy may be hydrolyzed to give a compound in which R is carboxy.

The following examples illustrate the invention.

EXAMPLE I 2-(2,3-xylylamino)nicotinic acid of formula:

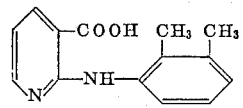

is prepared as follows. 5 g. of nicotinic acid, 7.6 ml. of 2,3-xylidine, and 0.1 g. of potassium iodide are intimately mixed and heated on an oil bath at 140° C. The mixture melts to give a dark red liquid. The temperature of the oil bath is allowed to fall to 100° C. and is maintained at this temperature for an hour and a half. The mixture puffs up and forms a yellow crystalline mass. After cooling to ordinary temperature, this mass is ground up in a motar and extracted several times with small volumes of ether to remove excess xylidine. The residue is then washed twice with 10 ml. of distilled water to remove xylidine hydrochloride and potassium iodide, and finally twice with 10 ml. of 95% alcohol to remove coloured resinous contaminants. After drying at 100° C., 7.8 grams of a powdered white or pale pink product are obtained, M.P. 246° C. (Kofler block). Potentiometric titration of the product with perchloric acid indicates that its purity is 98.2%. It can be crystallised from about 15 volumes of a mixture of dioxane and water (80:20), and the melting point is then raised to 248° C. (Kofler block). Titration as before shows that the recrystallised product has a purity of 100%.

*Analysis.* — Calculated for $C_{14}H_{14}N_2O_2$: Molecular weight=242.27. Percent: C=69.40; H=5.82; N=11.56. Found, percent: C=69.3; H=5.9; N=11.4.

The sodium salt of this acid is prepared for use in pharmacodynamic and clinical experiments. It is soluble in water and crystallises with one molecule of water of crystallisation. It may be dehydrated completely by heating to about 170° C. and melts at about 260° C. Pharmacological tests, described in more detail below, show that it has a good analgesic effect with a staisfactory therapeutic index, and also an anti-inflammatory action.

The condensation of 2-chloro-nicotinic acid with 2,3-xylidine may also be carried out in a suitable solvent, for example amyl alcohol, at reflux temperature, and in the presence of a little copper powder as catalyst.

EXAMPLE II 2-(2,6-xylylamino)nicotinic acid, having the formula:

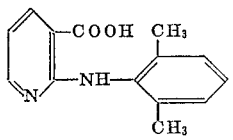

is prepared in the same way as the product of Example I but replacing 2,3-xylidine by 2,6-xylidine. It is obtained as white crystals, M.P. 219–220° C. (Kofler block).

EXAMPLE III 2-(p-methoxy-anilino)nicotinic acid is prepared following the procedure of Example I but replacing 2,3-xylidine by p-anisidine. After crystallisation from 95% alcohol, it melts at 208° C. (Kofler block).

EXAMPLE IV 2-(p-ethoxy-anilino)nicotinic acid is prepared following the procedure of Example I but replacing 2,3-xylidine by p-ethoxy-aniline. It melts at 202° C. (Kofler block).

EXAMPLE V 2-(o-hydroxy-anilino)nicotinic acid is prepared following the procedure of Example I but replacing 2,3-xylidine by o-amino-phenol. It melts at 234–235° C. (Kofler block).

EXAMPLE VI 2-(o-methyl-p-chloro-anilino)nicotinic acid is made by the procedure of Example I but replacing 2,3-xylidine by o-methyl-p-chloro-aniline. It is obtained as yellow crystals, M.P. 208–209° C. (Kofler block).

EXAMPLE VII

If the reaction described in Example I is carried out replacing the 2,3-xylidine by anthranilic acid, instead of obtaining the expected compound of formula:

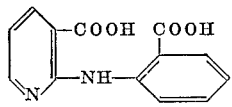

the compound of the following formula:

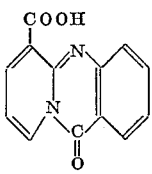

is obtained. It is formed by the cyclization with elimination of 1 molecule of water of the expected product. If methyl anthranilate is used in place of anthranilic acid itself the same product is obtained, methanol being eliminated rather than water. On treatment with 2 molecules of sodium hydroxide, the cyclized product gives the di-sodium salt of the expected product.

The reaction between 2-chloro-nicotinic acid and methyl anthranilate may be carried out as follows. 9 grams of 2-chloro-nicotinic acid and 18 ml. of methyl anthranilate are mixed with 0.1 g. of potassium iodide. The mixture is placed in a round bottom flask provided with a short fractionating column and heated on an oil bath to 145° C. At this temperature, the mixture becomes entirely liquid and takes on an orange colour. The temperature is then slowly raised and rapid boiling sets in accompanied by the distillation of a colourless liquid, B.P. 66–68° C., which is methanol. 1.4 ml. of methanol are recovered, the theoretical quantity being 1.92 ml. At the end of the reaction the reaction mass is entirely crystalline and the upper parts of the reaction vessel contain long needles of the hydrochloride of methyl anthranilate which has sublimed out of the reaction mixture. The total duration of heating is 1 hour at 145–150° C. After cooling, the crystalline reaction mass is taken up in 95% alcohol and filtered. The reaction product is washed several times with 95% alcohol until a bright yellow product is obtained. This is then washed with about 150 ml. of water to remove chlorides and potassium iodide, and dried in an oven at 100° C. for three hours. 9 grams of pure product are obtained, M.P. 221° C. (Kofler block), with resolidification and remelting at 226° C.

*Analysis:* — Calculated for $C_{13}H_8O_3N_2$: Molecular weight=240.22. Percent: C=64.90; H=3.32; N=11.64. Found, percent: C=64.93; H=3.28; N=11.69.

The mono-sodium salt of this compound is prepared by suspending 0.5 g. of 5 ml. of anhydrous alcohol and adding a few drops of 30% caustic soda solution. After good agitation for 15 minutes, the mixture takes on a pale yellow colour which indicates the end of the reaction. The sodium salt is filtered off, washed with absolute alcohol and dried. The yield is theoretical. This salt is slightly soluble in water giving a slightly alkaline solution (pH=8).

The di-sodium salt of the product is prepared by suspending 9 grams in 75 ml. of N-sodium hydroxide solution (=2 mols) mixed with 100 ml. of water. The mixture is heated until the product dissolves, and the clear solution is cooled and 150 ml. of ethyl alcohol are added. The precipitated di-sodium salt is filtered off, washed with a little anhydrous alcohol, and dried in an oven, first at 60° C. and then at 100° C. to constant weight. 8.2 grams of a straw-yellow compound are obtained, the sodium content of which corresponds to the di-sodium salt.

EXAMPLE VIII

Proceeding as in Example I, but using m-trifluoromethyl-aniline in place of 2,3-xylidine, 2-(m-trifluoromethyl-anilino)nicotinic acid is obtained as pale yellow needles (from 70% ethanol) melting at 204° C. (Kofler block).

EXAMPLE IX

Proceeding as in Example I, but using methyl p-amino-salicylate in place of 2,3-xylidine, 2-(p-carbomethoxy-m-hydroxyanilino)nicotinic acid is obtained as a light beige solid, M.P. 218° C. (Kofler block). It may be saponified to give the corresponding acid.

EXAMPLE X 2-(2,3-xylylamino)nicotinic acid (1.2 g., prepared as described in Example I), pyridine (1 ml.) and chloroform (5 ml.) are treated with propionyl chloride (0.6 ml.) and the mixture is warmed slightly till homogeneous. The mixture is allowed to stand for several hours and water (25 ml.) and chloroform (25 ml.) are then added. After shaking, the chloroform layer is separated and extracted with 5% sodium carbonate solution (50 ml.). The aqueous extract is separated and acidified to pH 1 with concentrated hydrochloric acid. The desired product, which is precipitated, is filtered off, washed with water and dried to constant weight. It melts at 195° C. (Kofler block).

The same compound may be made by heating under reflux for a few minutes a mixture of 2-(2,3-xylylamino) nicotinic acid (0.6 g.) and propionic anhydride (2 ml.).

An intense yellow liquid is obtained to which water (10 ml.) is added. The product which separates may be induced to crystallise by scratching and is then filtered off, washed with water and dried at 100° C. It melts at 195° C. (Kofler block) and is obtained in a yield of 0.67 g. (90% of theory).

EXAMPLE XI

Proceeding as in Example I, but replacing the 2,3-xylidine by p - chloro - o - hydroxy - aniline, 2 - (p-chloro - o - hydroxy - anilino)nicotinic acid is obtained, melting at 276° C. (uncorr.).

The invention includes within its scope pharmaceutical compositions containing one or more of the compounds of Formula I or non-toxic salts thereof in association with a pharmaceutically acceptable carrier compatible therewith. Such compositions may also contain other active compounds with which they are compatible, such as proteolytic enzymes, analgesics, anti-histaminics, antibiotics, and other anti-inflammatories.

The following pharmaceutical forms are especially suitable: tablets, pills, dragees, and capsules, each preferably containing 100 to 500 milligrams of active substance and liquid compositions for oral administration, such as syrups. Other useful compositions include: suppositories, each containing 200 to 500 milligrams of active substance; sterile injectable liquids, conveniently dispensed in ampoules of 2 to 5 cubic centimetres, each containing 100 to 600 milligrams of active substance; and creams and lotions containing 2 to 10% of active substance. They may be made by methods known per se in the art.

The pharmacological activity of 2 - (2,3 - xylylamino) nicotinic acid was determined as follows. The analgesic activity was determined by the Siegmund test and Eddy test. In the former test, mice are injected intraperitoneally with 0.25 ml. of an aqueous alcoholic solution of phenyl-benzoquinone so as to produce fits. It is found that a dose of 54 mg./kg. of the compound under test prevents the occurrence of fits in 50% of the test animals. This inhibitory effect is significant at a dose of 10 mg./kg., and a dose of 100 mg./kg. suppresses all fits.

In the Eddy test the mice are placed on a heated plate at 64–67° C. It is found that the product of the invention exerts its maximum effects 60 minutes after administration. A dose of 25 mg./kg. prolongs slightly the time before which the mice begin to lick their paws. This time is doubled by an oral dose of 200 mg./kg.

The anti-inflammatory activity of 2 - (2,3-xylylamino) nicotinic acid was determined as follows. In the first test, the activity of the compound in suppressing oedema produced in the tibio-tarsial region of the rat by injection of irritant substances such as 3% formalin, 6% dextran or 2 µg. of bradykinin, was found. The product of the invention has a strong anti-inflammatory effect at a dose of 100 mg./kg. against all the irritant substances used.

The compound was also found to have a strong inhibitory effect on the formation of granuloma tissue and exudate provoked by the implantation of pellets impregnated with a 1% solution of carragenin. An oral dose of 100 mg./kg. produced a 41% inhibition and a dose of 200 mg./kg. produced a 61% inhibition.

Doses from 50–200 mg./kg. of the 2-(2,3-xylylamino) nicotinic acid had no effect on the behaviour of mice nor gave rise to any motor disturbance.

The analgesic and anti-inflammatory effects of the compounds of the invention have been assessed in the clinic. In particular, the compound of Example I has been administered orally in different inflammatory conditions, and in particular the following: acute and chronic gout; rheumatic pelvi-spondylitis; chronic rheumatoid polyarthritis; and phlebitis.

The following case histories illustrate the results obtained with the compounds of the invention.

Antoine L., 49 years old.—This patient had established gout which had been treated continuously in known manner using an anti-inflammatory and colchicine. The treatment was continued replacing the known anti-inflammatory by the compound of Example I of this application. The regimen was as follows: the first two days of the week, two pills of colchicine each containing 1 mg. were administered; the five following days 500 mg. of the compound of the invention were administered orally at each meal. The treatment was continued for several weeks. The compound of the invention was excellently tolerated, and its substitution for the known anti-inflammatory did not lead to the reappearance of crises.

Bernard L., 53 years old.—This patient had gout which had been treated for 12 months with prednisolone at a daily dose of 20 mg. The steroid treatment was discontinued by substituting a daily intravenous injection of colchicine and a daily intra-muscular injection of phenylbutazone every day for eight days. On the ninth day, this regimen was replaced by an association of the compound of Example I of the present application and colchicine. The new treatment has been well tolerated, and the patient's condition has been stabilized. Not only does he no longer suffer pains in the joints, but the functions of the joints have much improved.

Jean H., 45 years old.—This patient had a polyarthric tophaceous gout affecting toes, ankles and knees with frequent crises, about ten a year. Despite a relatively slightly raised uricemia (6.5 mg. percent), various uricosuric substances had been used without result. He was treated with the compound of Example I and colchicine for two months. The treatment was well tolerated and the patient experienced no new crisis during these two months, although such crises had recurred regularly during the preceding years.

Marcel B., 28 years old.—This patient had a polyarthritic gout with 14 or 15 crises a year, necessitating prolonged absences from work. Each crisis had been treated with phenylbutazone (by intra-muscular injection or suppository), which cured the crisis but did not prevent its return. For three months, the patient was treated with the compound of Example I and colchicine, and no new crisis occurred. The tolerance was good.

Jeanne H., 42 years old.—The patient had suffered for two years from rheumatic pelvi-spondylitis, and had been treated discontinuously and successfully by two intra-muscular injections per week of phenylbutazone. 250 mg. of the compound of Example I, administered orally, taken each day with the midday meal were substituted for the injections of phenylbutazone. The tolerance was excellent, the results were good, and the change of treatment did not alter the sedimentation rate.

Danielle L., 22 years old.—This patient had had for a year local pains in the joints of the ankles and knees caused by urates, and lumbago for three months. A radiographic examination showed characteristic injury of the sacroiliac joints with reduction of the cartilages and thickening of the sides of the joints. The sedimentation rate was 35/64. The patient was diagnosed to be suffering from pelvi-spondylitis. Treatment with 250 mg. of the compound of Example I, given orally three times a day, morning, midday and evening, was prescribed for a month. It was very well tolerated, and the patient's condition was much improved. The sedimentation rate improved to 26/45.

Alice D., 60 years old.—This patient showed multiple injury to the joints, deformities, a continuous subfebrile state, anaemia, and a loss of weight of about 10 kg. The sedimentation rate was 80/120, and the reaction to the Waaler-Rose test was positive. This chronic rheumatoid polyarthritis was treated with, in addition to rest and a synthetic antimalarial, 250 mg. of the compound of Example I orally at three meals each day. After two months of treatment, the inflammation of the joints was reduced, the movement of the joints was easier, the subfebrile state disappeared, the patient had gained weight, and the sedimentation rate had improved to 50/76. This result is very remarkable in view of the extreme gravity of the patient's initial state.

Colette L., 58 years old.—This patient had chronic rheumatic polyarthritis which had begun in an atypical manner characterised by diffuse decalcification of the foot, followed within six months by an infectious syndrome giving rise to intermittent fever. The patient lost nearly 18 kg. weight, was anaemic, and was obliged by the pain to keep to her bed. The sedimentation rate was 120/135, and electrophoresis of the blood showed abnormally large amounts of alpha-2- and gamma-globulings, without however the very large amount of gamma-globulins characteristic of Kalher disease. Because of the polyarthritic injury, the recent injury to the metocarpophalanges and the proximal interphalanges, the condition was diagnosed as a very evolved form of chronic rheumatic polyarthritis. The patient was treated with 750 mg. of the compound of Example I per day, orally, a synthetic antimalarial, calcium, and ambivalent sex hormones. In 2½ months the patient's condition had been transformed. The fever had ceased. The appetite and weight had been regained. The conditions of the joints had improved. The sedimentation rate had improved to 55/80. The tolerance of the treatment was excellent. This result is the more remarkable, because if antimalarials are used alone there is generally a slight delay in improvement, while in the case reported the improvement was very rapid, and as early as the fifteenth day, the effect of the treatment was already markedly favourable.

Marie R., 60 years old.—This woman had phlebitis in her left leg and also had a large hiatal hernia with which the phlebitis was connected. The compound of the invention was administered with anti-coagulants, and the gastric tolerance of the treatment was excellent. The inflammatory phenomena improved more rapidly than usual, with a fall in temperature and normalisation of the blood picture.

Charles D., 65 years old.—This man had phlebitis in his right leg without any detectable point of entry. No neoplasm could be detected. The compound of the invention was administered with anti-coagulants, and the treatment was then very well tolerated. It had a favourable action on the patient's temperature, hastened the cure of the venous thrombosis, and led to normalisation of the blood count and formula.

Henri L., 58 years old.—This patient had been hospitalized for an acute pneumopathy, and received the compound of Example I together with antibiotics. The treatment produced a favourable effect.

Clinical experiment has confirmed the therapeutic interest of the compounds of the invention, and their analgesic and anti-inflammatory properties indicated by pharmacological tests have been confirmed, and this despite the gravity of the cases treated. Up till now, cases of gout accompanied by frequent crises have been treated with corticosteroids. However, the compounds of the invention used with colchicine make it possible to avoid the use of corticosteroids.

The effects of the compounds of the invention on chronic rheumatoid polyarthitis have been remarkable although these conditions are very difficult to treat. The same effect has been noted with certain cases of recurrent polyarthritis.

These initial tests show the remarkable properties of the compounds of the invention both as analgesics and anti-inflammatories, and show that they are well tolerated and constitute the medicament of choice for affections where there is inflammation and pain, especially rheumatic affections.

We claim:

1. A compound selected from the group consisting of a compound of the general formula:

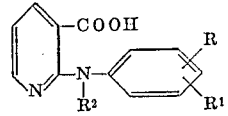

wherein R and $R^1$ are each hydroxy, lower alkyl, trifluoromethyl, lower alkoxy, carboxy or chloro, $R^2$ is hydrogen or lower alkanoyl and R and $R^1$ together are in one of the pairs of positions 2,4-, 2,6-, 3,4- or 4,6-.

2. A compound selected from the group consisting of a compound of the general formula:

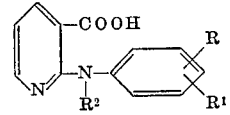

wherein R and $R^1$ are both lower alkyl and are in the 2,3- or in the 2,6-positions and $R^2$ is hydrogen or lower alkanoyl.

3. A compound selected from the group consisting of a compound of the general formula:

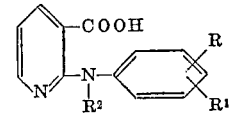

wherein one of R and $R^1$ is hydroxy or carboxy and $R^2$ is hydrogen or lower alkanoyl.

4. A compound selected from the group consisting of 2-(2,3-xylylamino)nicotinic acid and its sodium salt.

5. A compound selected from the group consisting of 2-(2,6-xylylamino)nicotinic acid and its sodium salt.

6. A compound selected from the group consisting of 2-(p-methoxyanilino)nicotinic acid and its sodium salt.

7. A compound selected from the group consisting of 2-(p-ethoxyanilino)nicotinic acid and its sodium salt.

8. A compound selected from the group consisting of 2-(o-hydroxyanilino)nicotinic acid and its sodium salt.

9. A compound selected from the group consisting of 2-(p-carbomethoxy-m-hydroxyanilino)nicotinic acid and its sodium salt.

10. A compound selected from the group consisting of N-propionyl-2-(2,3-xylylamino)nicotinic acid and its sodium salt.

11. A compound selected from the group consisting of 2-(p-chloro-o-hydroxyanilino)nicotinic acid and its sodium salt.

References Cited

UNITED STATES PATENTS 3,337,570   8/1967   Sherlock et al. _____ 260—295.5

HENRY R. JILES, *Primary Examiner.*

ALAN L. ROTMAN, *Assistant Examiner.*

U.S. Cl. X.R.

260—287; 167—65